US008854733B2

(12) United States Patent
Nakabayashi

(10) Patent No.: US 8,854,733 B2
(45) Date of Patent: Oct. 7, 2014

(54) OPTICAL LENS

(75) Inventor: Makoto Nakabayashi, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 299 days.

(21) Appl. No.: 12/810,686

(22) PCT Filed: Dec. 26, 2008

(86) PCT No.: PCT/JP2008/073861
§ 371 (c)(1),
(2), (4) Date: Jun. 25, 2010

(87) PCT Pub. No.: WO2009/084690
PCT Pub. Date: Jul. 9, 2009

(65) Prior Publication Data
US 2010/0271703 A1    Oct. 28, 2010

(30) Foreign Application Priority Data

Dec. 28, 2007 (JP) .................................. 2007-338820

(51) Int. Cl.
| G02B 1/10 | (2006.01) |
| C08L 77/06 | (2006.01) |
| C08L 77/00 | (2006.01) |
| C08L 77/02 | (2006.01) |
| G02B 3/08 | (2006.01) |
| G02B 1/04 | (2006.01) |
| G03B 15/00 | (2006.01) |

(52) U.S. Cl.
CPC ................. *G02B 1/041* (2013.01); *C08L 77/06* (2013.01); *C08L 77/00* (2013.01); *C08L 77/02* (2013.01); *G02B 3/08* (2013.01); *G03B 15/00* (2013.01)
USPC ............. 359/581; 524/81; 524/553; 524/555; 524/556; 428/336

(58) Field of Classification Search
USPC .................... 524/553, 555, 556, 81; 359/581; 428/336
See application file for complete search history.

(56) References Cited

U.S. PATENT DOCUMENTS

| 4,731,421 | A |   | 3/1988 | Hoppe et al. |
| 6,136,915 | A | * | 10/2000 | Ohara et al. ................... 524/538 |
| 6,556,350 | B2 | * | 4/2003 | Nakaho et al. ................ 359/634 |
| 7,935,423 | B2 | * | 5/2011 | Belliot .......................... 428/432 |
| 2003/0065065 | A1 | * | 4/2003 | Urata et al. ...................... 524/99 |
| 2004/0061433 | A1 | * | 4/2004 | Izuno et al. ................... 313/498 |
| 2004/0192821 | A1 |   | 9/2004 | Asbahr et al. |
| 2007/0249789 | A1 |   | 10/2007 | Buehler et al. |
| 2007/0293626 | A1 |   | 12/2007 | Chakravarti et al. |
| 2008/0224159 | A1 | * | 9/2008 | Krauter et al. ................... 257/98 |
| 2009/0171038 | A1 |   | 7/2009 | Steffner |

FOREIGN PATENT DOCUMENTS

| CN | 101029162 A | 9/2007 |
| CN | 101058670 A | 10/2007 |
| GB | 2 197 332 A | 5/1988 |
| JP | 62-121726 | 6/1987 |
| JP | 63-170418 A | 7/1988 |
| JP | 09-137057 | 5/1997 |
| JP | 10-282336 | 10/1998 |
| JP | 2000186141 A | 7/2000 |
| JP | 2000347003 A | 12/2000 |
| JP | 2002-138194 | 5/2002 |
| JP | 2002-146068 A | 5/2002 |
| JP | 2003-327726 A | 11/2003 |
| JP | 2004-107488 | 4/2004 |
| JP | 2004-256812 | 9/2004 |
| JP | 2004-535504 | 11/2004 |
| JP | 2005-055724 A | 3/2005 |
| JP | 2006213759 A | 8/2006 |
| JP | 2007-196474 | 8/2007 |
| JP | 2007264403 A | 10/2007 |
| JP | 2007-327049 | 12/2007 |
| JP | 2009-520853 A | 5/2009 |
| WO | WO 2006/114082 A2 | 11/2006 |
| WO | 2007/074086 A1 | 7/2007 |

OTHER PUBLICATIONS

Machine translation of JP 2005-055724. 2005.*
Japanese Notice of Grounds of Rejection, with English Translation, issued in Japanese Patent Application No. 2009-548119, mailed Sep. 7, 2010.
Japanese Office Action, and English translation thereof, issued in Japanese Patent Application No. 2011-015202 dated Feb. 22, 2013.
Japanese Office Action with English translation issued in Japanese Application No. 2011-015202 dated Nov. 11, 2013.
Chinese Office Action, w/ English translation thereof, issued in Chinese Patent Application No. CN 200880123281.2 dated Aug. 12, 2013.

* cited by examiner

*Primary Examiner* — Bijan Ahvazi
*Assistant Examiner* — Wenwen Cai
(74) *Attorney, Agent, or Firm* — McDermott, Will & Emery LLP

(57) ABSTRACT

An optical lens made of resin, which includes a molded body made of a molding material containing a transparent polyamide such as polyamide 12 and a stabilizer, which has total light transmittance of at least 60% when the molded body has a thickness of 2 mm, and has total light transmittance of at least 50% after the molded body maintained at 80° C. was irradiated with light in an amount of 1000 W/m² for 500 hours by using a xenon lamp, which is lightweight, highly transparent, and resistant to discoloration, deformation, aging, and the like due to irradiation with light emitted from a xenon lamp, a blue-violet laser or the like serving as a light source, and which is suitable for use in a light emitting device of a flash lamp and the like, is provided.

10 Claims, No Drawings

OPTICAL LENS

RELATED APPLICATIONS

This application is the U.S. National Phase under 35 U.S.C. §371 of International Application No. PCT/JP2008/073861, filed on Dec. 26, 2008, which in turn claims the benefit of Japanese Application No. 2007-338820, filed on Dec. 28, 2007, the disclosures of which Applications are incorporated by reference herein.

TECHNICAL FIELD

The present invention relates to an optical lens made of resin suitable for use in condensing light and the like with a xenon lamp or a blue-violet laser serving as a light source.

BACKGROUND ART

An optical lens made of transparent resin is characterized by being lightweight, less likely to break, and easy to mold as compared to an optical lens made of inorganic glass, and is thus widely used in a variety of optical equipment. Thermoplastic resins such as polymethyl methacrylate, polycarbonate, cyclic polyolefin are known as transparent resins used for molding an optical lens.

These resin-molded products, however, have insufficient light resistance and heat resistance, and are discolored, age, and the like due to light irradiation. Further, a molded body made of polymethyl methacrylate or polycarbonate has low scratch resistance, and an optical lens made thereof has an insufficient surface hardness and requires a surface protective layer.

Transparent polyamides disclosed in Patent Document 1, Patent Document 2, Patent Document 3, and the like are also available for forming an optical lens. Patent Document 4 proposes, as an optical lens having a high surface hardness, an uncoated lens made of colorless, transparent copolymerized polyamides including a) at least one cycloaliphatic diamine having a carbon number from 6 to 24, b) at least one aromatic dicarboxylic acid having a carbon number from 8 to 16 in a nearly equimolar ratio, and c) up to 20 mol-% of polyamide-forming monomers.

Patent Document 1: Japanese Patent Laying-Open No. 62-121726
Patent Document 2: Japanese Patent Laying-Open No. 63-170418
Patent Document 3: Japanese Patent Laying-Open No. 2004-256812
Patent Document 4: Japanese Patent Laying-Open No. 9-137057

DISCLOSURE OF THE INVENTION

Problems to be Solved by the Invention

Although some of optical lenses made of these transparent polyamides have excellent heat resistance and UV resistance, they are discolored, deformed, age, and the like when they are irradiated with a large amount of light emitted from a xenon lamp or a blue-violet laser (405 nm) serving as a light source. A xenon lamp produces light by application of a voltage to a glass tube filled with xenon gas for discharge, and is considered to achieve low power consumption and a long lifetime. A xenon lamp is also characterized by having spectral distribution of a visible light range similar to that of sunlight, and requiring little time from the time of activation until the time when a luminous flux is stabilized, and is thus widely utilized as a light source and the like of a light emitting device such as a so-called flash lamp.

A first object of the present invention is to provide an optical lens made of resin resistant to discoloration, deformation, aging, and the like due to light irradiation even in such a light emitting device and the like with a xenon lamp or a blue-violet laser serving as a light source.

An optical product having an optical lens installed in a holder or the like is usually subjected to surface cleaning with an organic solvent such as ethanol at the time of shipment. In particular, during manufacture of a special lens such as a non-spherical lens called a Fresnel lens, the lens is cleaned with an organic solvent in a final step. A surface of an optical lens made of transparent polyamide, however, turns white due to an organic solvent used in the cleaning.

A second object of the present invention is to provide the optical lens made of resin described above, which is also resistant to deterioration such as turning to white of its surface even after surface cleaning with an organic solvent is conducted.

Means for Solving the Problems

The present inventor earnestly conducted studies, and found that an optical lens resistant to discoloration, deformation, aging, and the like due to light irradiation is obtained even when a xenon lamp or the like is used as a light source, by forming the lens from a transparent resin molded body made of a molding material containing a transparent polyamide and a stabilizer.

The present inventor also found that an optical lens resistant to deterioration such as turning to white of its surface even after surface cleaning with an organic solvent is conducted is obtained, by forming a transparent coating film made of an inorganic compound on the surface of the optical lens. The present invention was completed based on these study results.

According to one aspect of the present application there is provided an optical lens including a molded body made of a molding material containing a transparent polyamide and a stabilizer, the optical lens having total light transmittance of at least 60% when the molded body has a thickness of 2 mm, and having the total light transmittance of at least 50% after the molded body maintained at 80° C. was irradiated with light in an amount of 1000 W/m$^2$ for 500 hours by using a xenon lamp, and a blend ratio of the stabilizer being 0.01 to 5 parts by weight with respect to 100 parts by weight transparent polyamide.

The transparent polyamide is an amorphous polyamide having a high glass transition temperature, and can be obtained by condensation of diamine and dicarboxylic acid, for example.

Examples of the diamine used here include:
branched open-chain or non-branched open-chain aliphatic diamines having 6 to 14 C atoms, e.g., 1,6-hexamethylenediamine, 2-methyl-1,5-diaminopentane, 2,2,4-trimethylhexamethylenediamine, 2,4,4-trimethylhexamethylenediamine, 1,9-nonamethylenediamine, 1,10-decamethylenediamine, and 1,12-decamethylenediamine;

cycloaliphatic diamines having 6 to 22 C atoms, e.g., 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)-cyclohexane, 2,6-bis(aminomethyl)-norbornane, or 3-aminomethyl-3,5,5-trimethylcyclohexylamine; and araliphatic diamines having 8 to 22 C atoms, e.g., m-xylylenediamine, or p-xylylenediamine or bis(4-aminophenyl)propane.

Examples of the dicarboxylic acid include:

branched open-chain or non-branched open-chain aliphatic dicarboxylic acids having 6 to 22 C atoms, e.g., adipic acid, 2,2,4-trimethyladipic acid, 2,4,4-trimethyladipic acid, azelaic acid, sebacic acid, or 1,12-dodecanedioic acid;

cycloaliphatic dicarboxylic acids having 6 to 22 C atoms, e.g., cyclohexane-1,4-dicarboxylic acid, 4,4'-dicarboxydicyclohexylmethane, 3,3'-dimethyl-4,4'-dicarboxydicyclohexylmethane, 4,4'-dicarboxydicyclohexylpropane, or 1,4-bis(carboxymethyl)cyclohexane;

araliphatic dicarboxylic acids having 8 to 22 C atoms, e.g., 4,4'-diphenylmethanedicarboxylic acid; and aromatic dicarboxylic acids having 8 to 22 C atoms, e.g., isophthalic acid, tributylisophthalic acid, terephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, or diphenylether-4,4'-dicarboxylic acid.

The transparent polyamide can also be obtained by ring-opening polymerization of lactam, condensation of ω-aminocarboxylic acid, or the like. Examples of a raw material monomer used here include lactam having 6 to 12 C atoms or corresponding ω-aminocarboxylic acid, ε-caprolactam, ε-aminocaproic acid, capryllactam, ω-aminocaprylic acid, ω-aminoundecanoic acid, laurinlactam, or ω-aminododecanoic acid, and the like.

Preferable examples of the transparent polyamide include an amorphous polyamide having a high glass transition temperature and having a ring such as an aromatic ring or an aliphatic ring, and a polyamide having a carbon number of at least 10 obtained by ring-opening polymerization of lactam or condensation of ω-aminocarboxylic acid, as disclosed in Patent Document 1, Patent Document 2, and Patent Document 3.

More specific examples of a polyamide having a ring such as an aromatic ring or an aliphatic ring include:

a polyamide including terephthalic acid, and an isomer mixture of 2,2,4-trimethylhexamethylenediamine and 2,4,4-trimethylhexamethylenediamine;

a polyamide including isophthalic acid and 1,6-hexamethylenediamine;

a copolyamide including terephthalic acid/isophthalic acid, and 1,6-hexamethylenediamine;

a copolyamide including isophthalic acid, and 3,3'-dimethyl-4,4'-diaminodicyclohexylmethane, and laurinlactam or caprolactam;

a (co)polyamide including 1,12-dodecanedicarboxylic acid or 1,10-decanedicarboxylic acid, and 3,3'-dimethyl-4,4'-diaminodicyclohexylmethane, and where appropriate, further laurinlactam or caprolactam;

a copolyamide including isophthalic acid, 4,4'-diaminodicyclohexylmethane, and laurinlactam or caprolactam;

a polyamide including 1,12-dodecanedioic acid and 4,4'-diaminodicyclohexylmethane; and a copolyamide including a mixture of terephthalic acid/isophthalic acid, and 3,3'-dimethyl-4,4'-diaminodicyclohexylmethane, and laurinlactam.

Examples of the polyamide having a carbon number of at least 10 obtained by ring-opening polymerization of lactam or condensation of ω-aminocarboxylic acid include polyamide 12 or the like, which is commercially available under the trade name of nylon 12 or the like.

Further, the transparent polyamide may be manufactured through synthetic reaction (polymerization) with a raw material monomer in the presence of a stabilizer, a cross-linking assistant, a reinforcing material, and the like which will be describe later.

Furthermore, the transparent polyamide may be a blend of a number of different polyamides within the scope of the present invention. This blend may include a crystalline component as long as the blend itself is transparent.

A commercially available product may be used as the transparent polyamide described above. For example, a copolyamide composed of isophthalic acid and 3,3'-dimethyl-4,4'-diaminodicyclohexylmethane and laurinlactam is commercially available under the trade name of Grilamid TR-55 (EMS-CHEMIE (Japan) Ltd.) and the like, and a polyamide composed of a condensation polymer of 1,10-decanedicarboxylic acid and 3,3'-dimethyl-4,4'-diaminodicyclohexylmethane is commercially available under the trade name of Grilamid TR-90 (EMS-CHEMIE (Japan) Ltd.) and the like, and these may be used. Other specific product examples of the transparent polyamide used in the present invention include Trogamid CX7323, Trogamid T, Trogamid CX9701 (trade names, all manufactured by Daicel-Degussa Ltd.), Grilamid TR-155, Grivory G21, Grilamid TR-55LX, Grilon TR-27 (all by EMS-CHEMIE (Japan) Ltd.), Cristamid MS 1100, Cristamid MS 1700 (both by Arkema), Selar 3030E, Selar PA-V2031 (both by Du Pont), Isoamid PA-7030 (Du Pont), and the like.

Alternatively, a polyamide relatively prone to turn white such as nylon 6, to which a nucleating agent has been added to increase transparency, may also be used as the transparent polyamide. A nucleating agent produces uniform and minute crystals in a crystalline polymer, and enhances transparency while improving mechanical properties such as rigidity and a heat deformation temperature. Exemplary nucleating agents include a liposome nucleating agent, a nucleating agent commercially available under the trade name of Pinecrystal KM1500 (manufactured by Arakawa Chemical Industries, Ltd.), and the like.

The transparent polyamide is preferably composed of a monomer formed by chemical bond having main polarizability of $0.6 \times 10^{-23}$ or less. If main polarizability of a monomer varies depending on the direction of chemical bond, it is preferable that the monomer be formed by chemical bond of $0.6 \times 10^{-23}$ or less in any direction. If a monomer forming the transparent polyamide contains a monomer including chemical bond having main polarizability exceeding $0.6 \times 10^{-23}$, an optical elastic constant becomes larger and birefringence due to molding and stress increases, more likely to result in difficulty in obtaining a sharp image.

When an optical lens including a molded body in which an acrylic resin such as a transparent polyamide or polymethyl methacrylate contains a stabilizer is irradiated with light for a long period of time at approximately 80° C. from a xenon lamp or a blue-violet laser, white streaks or discoloration to black may occur. When a transparent polyamide composed of the condensation polymer of 1,10-decanedicarboxylic acid and 3,3'-dimethyl-4,4'-diaminodicyclohexylmethane among the above examples is used, however, such occurrence is less likely, which is preferable. In certain embodiments the transparent polyamide is composed of the condensation polymer of 1,10-decanedicarboxylic acid and 3,3'-dimethyl-4,4'-diaminodicyclohexylmethane.

A polyamide has polarity, and thus has high adhesion strength in plating and vapor deposition. Accordingly, a polyamide is suitable for use in such applications as formation of a circuit in an optical lens.

The molding material used for manufacturing the optical lens according to the present invention contains a stabilizer in addition to the transparent polyamide described above. The stabilizer herein includes all stabilizers having a function of preventing deterioration due to light, heat and the like, and also includes, for example, an antioxidant having a function of preventing oxidation due to light and the like, such as hindered phenol. More specific examples include a hindered amine light stabilizer, a UV absorber, a phosphorous-based stabilizer, a hindered phenolic antioxidant, and the like. The hindered amine light stabilizer may be Adeka Stab LA68, LA62 (trade names, manufactured by Asahi Denka Co., Ltd.) and the like, the UV absorber may be Adeka Stab LA36 (trade name, manufactured by Asahi Denka Co., Ltd.) and the like, the phosphorous-based stabilizer may be Irgafos 168 (trade name, manufactured by Ciba Specialty Chemicals Inc.) and the like, the hindered phenolic antioxidant may be Irganox 245 (trade name, manufactured by Ciba Specialty Chemicals Inc.) and the like, which are all commercially available products. When two or more types of stabilizers are used together, performance as a stabilizer is improved, which may lead to a more beneficial effect.

A preferable range of a blend ratio of the stabilizer into the molding material varies depending on a type of a stabilizer, types and amounts of a UV absorber and an antioxidant used together and the like, and is not particularly limited. Usually, the higher the blend ratio, the smaller the extent of discoloration and the like due to irradiation with a xenon lamp or the like. If the blend ratio is too high, however, bloom, deterioration of haze, lowering in transmittance, and the like are caused. Therefore, when one type of stabilizer is used, approximately 0.01 to 5 parts by weight stabilizer with respect to 100 parts by weight transparent polyamide is usually preferable.

The molding material used for manufacturing the optical lens according to the present invention may have other components, for example, a weather-resistant stabilizer, a copper inhibitor, a flame retardant, a lubricant, a conducting agent, a plating agent added thereto, as long as they do not compromise the purpose of the present invention.

The optical lens according to the present invention is obtained by molding the molding material described above. Specifically, the optical lens can be obtained by kneading the molding materials with the use of a single-screw extruder, a twin-screw extruder, a compression kneader or the like, and molding the material with a known molding method. A kneading device is preferably a twin-screw extruder in particular, although not particularly limited as such, and a kneading temperature from approximately 230° C. to 300° C. and a kneading period from approximately 2 to 15 minutes are generally preferably employed. A molding method is not particularly limited and may be an injection molding method, an injection compression molding method, a press molding method, an extrusion molding method, a blow molding method, or a vacuum molding method, for example. The injection molding method is preferable in terms of ease of molding and accuracy of molding.

The molded body (transparent resin molded body) forming the optical lens according to the present invention has total light transmittance of at least 60% when the molded body has a thickness of 2 mm. The total light transmittance refers to an index indicating transparency, which is measured with the measurement method prescribed in JIS K 7361, and is expressed in percentage of a ratio between an amount of incident light $T_1$ and a total amount of light $T_2$ that has passed through a test piece in a range of visible light, specifically in a wavelength range from 400 to 800 nm. With the total light transmittance of at least 60%, the optical lens according to the present invention has high transparency in the visible light range, and is suitable for use as a lens of a light emitting device and the like. Total light transmittance of at least 60% can be readily obtained by using the exemplary polyamides described above in a composition of the molding material.

The molded body (transparent resin molded body) forming the optical lens according to the present invention has total light transmittance after the molded body maintained at 80° C. was irradiated with light having energy in an amount of 1000 W/m$^2$ for 500 hours by using a xenon lamp, i.e., the total light transmittance when the molded body has a thickness of 2 mm, of at least 50%. Usually, irradiation with light is preferably performed by placing light beams (xenon lamp) at a position 7 mm away from the surface of the molded body having a thickness of 2 mm. The molded body having total light transmittance of at least 50% even after this prescribed light irradiation can be readily obtained by blending the stabilizer described above into the molding material.

The molded body forming the optical lens according to the present invention preferably has a storage modulus of elasticity at 270° C. of at least 0.1 MPa. With the storage modulus of elasticity at 270° C. of at least 0.1 MPa, satisfactory rigidity from a room temperature to a high temperature is obtained, and the optical lens is resistant to heat deformation even when mounted by soldering with the use of lead-free soldering or by solder reflow, or when an environment of use attains to a high temperature. The optical lens is thus high in so-called reflow heat resistance, which is preferable.

The storage modulus of elasticity herein refers to a term (real number term) constituting a complex modulus of elasticity indicating relation between stress when sinusoidal vibration strain is applied to a viscoelastic body and strain, and is a value measured with a dynamic mechanical spectrometer (DMS). More specifically, it is a value measured with the dynamic mechanical spectrometer DVA-200 manufactured by IT Keisoku Seigyo Co., Ltd., with a rate of temperature increase of 10° C./min starting from a room temperature (25° C.).

The molded body forming the optical lens according to the present invention preferably further contains a filler as a reinforcing material. By containing the filler, the storage modulus of elasticity at 270° C. can be readily set to at least 0.1 MPa, and moldability and heat resistance are improved.

A so-called transparent filler having a refractive index similar to that of the transparent polyamide is used as the filler, in order not to lose transparency of the molded body. Glass fiber represents an exemplary transparent filler. An added amount thereof is preferably 0.1 to 50 parts by weight, and more preferably 1 to 50 part(s) by weight, with respect to 100 parts by weight transparent polyamide. Alternatively, a filler, fumed silica, a nanometal filler, or a nanocomposite filler in which a particle size of the filler is equal to or smaller than a wavelength of light may also be used. Examples of an organic filler include bio-nano fiber (Kyoto University).

In the molded body forming the optical lens according to the present invention, the resin may be cross-linked through heating or irradiation with radioactive rays. Cross-linking leads to better heat resistance and storage modulus of elasticity. In order to facilitate cross-linking, procedures such as inserting a polymerization unit having double bond in a main chain of transparent polyamide, containing a cross-linking assistant, and the like are performed.

Examples of the cross-linking assistant include: oximes such as p-quinone dioxime, and p,p'-dibenzoyl quinone dioxime; acrylates or methacrylates such as ethylene dimethacrylate, polyethylene glycol dimethacrylate, trimethylolpropane trimethacrylate, cyclohexyl methacrylate, a mixture of acrylic acid/zinc oxide, and allyl methacrylate;

vinyl monomers such as divinylbenzene, vinyltoluene, and vinylpyridine; allylic compounds such as hexamethylene diallyl nadiimide, diallyl itaconate, diallyl phthalate, diallyl isophthalate, diallyl monoglycidyl isocyanurate, triallyl cyanurate, and triallyl isocyanurate (hereinafter referred to as TAIC); maleimide compounds such as N,N'-m-phenylene bismaleimide, and N,N'-(4,4'-methylenediphenylene)dimaleimide. These cross-linking assistants may be used alone or in combination.

In certain embodiments, the molding material further contains less than 25 parts by weight TAIC with respect to 100 parts by weight transparent polyamide.

TAIC among the exemplary cross-linking assistants described above is trifunctional and thus has excellent cross-linkability. By containing TAIC, the reflow heat resistance of the optical lens can be readily improved through irradiation with radioactive rays and the like, which is preferable. TAIC is also preferable in that it has good compatibility with the transparent polyamide (particularly the condensation polymer of 1,10-decanedicarboxylic acid and 3,3'-dimethyl-4,4'-diaminodicyclohexylmethane which will be described later) and can be dissolved in a high concentration of approximately 50% by weight with respect to the transparent polyamide (as will be described later, however, molding becomes difficult if the concentration of TAIC is too high), that it is discolored to relatively small extent due to irradiation with radioactive rays and heat, and that it has low toxicity for human body (for example, a substance containing an epoxy group or a glycidyl group is toxic), and the like.

When TAIC is used as the cross-linking assistant, a content thereof is preferably less than 25 parts by weight, and more preferably 1 to 20 parts(s) by weight, with respect to 100 parts by weight transparent polyamide. The higher the content of TAIC, the more the cross-linking is promoted and the reflow heat resistance and the like are improved. If the content is higher than the range described above, however, solidification occurs too late and moldability is lowered, which may result in failure to obtain good appearance of a molded product.

Methods of containing the cross-linking assistant include a method of adding the cross-linking assistant to the molding material, and kneading the cross-linking assistant with the molding material. Accordingly, a method and preferable conditions for kneading are the same as those for kneading the molding material described above, and a twin-screw extruder may be a particularly preferable kneading device, for example.

In certain embodiments, the optical lens includes a coating film made of an inorganic compound and having total light transmittance of at least 80% on at least one surface thereof.

This optical lens has at least one surface covered with the coating film made of an inorganic compound, thus attaining excellent solvent resistance of the surface. Accordingly, deterioration such as turning to white of the surface is less likely even after usual surface cleaning with an organic solvent such as ethanol is conducted at the time of shipment of an optical product. By applying this optical lens, deterioration such as turning to white of a surface can be prevented even during manufacture of a special lens such as a Fresnel lens which is cleaned with an organic solvent in a final step.

By causing the cross-linking described above in the molded body forming the optical lens, chemical resistance of the optical lens is also improved. However, the aforementioned problem, namely, turning to white of a surface of the lens due to cleaning with an organic solvent, cannot be sufficiently prevented even after causing the cross-linking by adding the cross-linking assistant to the molded body forming the optical lens. The present inventor earnestly conducted studies, and found that occurrence of this problem can be prevented by covering a surface of the lens with a coating film made of an inorganic compound.

The coating film is formed on at least one surface of the optical lens. With the coating film formed on only one surface, solvent resistance of the surface is improved. The coating film is preferably formed on opposite surfaces.

A thickness of the coating film is selected such that excellent solvent resistance, high transparency, and high mechanical strength are obtained. If the thickness is too small, the solvent resistance may be insufficient. If the thickness is too large, on the other hand, the transparency tends to be lower. In either case where the thickness is too small or too large, mechanical strength may be lower, and occurrence of breakage, crack, peeling of the film resulting from difference in coefficient of linear expansion and the like may be more likely. The thickness should only be equal to or larger than a prescribed value in order to obtain sufficient solvent resistance, and further increase in the thickness does not lead to improvement in solvent resistance. Thus, it is economically disadvantageous to increase the thickness too much.

A preferable range of the thickness of the coating film, which varies depending on a type or the like of an inorganic compound forming the film and is not specifically limited, is usually approximately 5 to 500 nm (if the coating film includes a plurality of layers, this being the total thickness of the layers).

The coating film is required to have high transparency. Low transparency impedes performance as an optical lens. Specifically, total light transmittance of at least 80% is required. The total light transmittance is herein defined in the same way as above. In order to prevent performance as an optical lens from being impeded, the total light transmittance is desirably higher than 80%, and more preferably at least 90%, with a thickness of 2 mm.

Methods of providing the coating film include physical vapor deposition (PVD). PVD includes a vacuum deposition method, a sputtering method, an ion plating method, and the like. For example, by forming the coating film with a sputtering method in inert gas such as Ar, a dense coating film having excellent mechanical strength is obtained. Other methods such as chemical vapor deposition (CVD) may be used depending on a type of an inorganic compound.

In certain embodiments, the inorganic compound is selected from the group consisting of $MgF_2$, $YF_3$, $LaF_3$, $CeF_3$, $BaF_2$, $HfO_2$, $SiO_2$, $TiO_2$, $Al_2O_3$, $Y_2O_3$, $Ta_2O_5$, $La_2O_3$, and $ZrO_2$.

The inorganic compound forming the coating film is selected from among compounds capable of forming a film having excellent mechanical strength even with a small thickness, and having excellent solvent resistance and transparency. In order to obtain a film that is less likely to peel off, the coating film (lowermost layer if the coating film includes a plurality of layers) is preferably made of a material adapted well to the transparent polyamide forming the optical lens.

Examples of the inorganic compound include a metal oxide, a metal fluoride, and a zinc compound such as ZnS. In order to attain excellent solvent resistance and transparency, metal oxides such as $HfO_2$, $SiO_2$, $TiO_2$, $Al_2O_3$, $Y_2O_3$, $Ta_2O_5$, $ZrO_2$, $Ta_2O_5$, and $La_2O_3$, and metal fluorides such as $MgF_2$, $YF_3$, $LaF_3$, $CeF_3$, and $BaF_2$ are particularly preferable, and a coating film mainly composed of an inorganic compound selected from the group consisting thereof is preferable. The term "mainly" refers to a case where the coating film consists only of the exemplary compound(s) described above, or contains at least 50% by weight, preferably at least 80% by weight exemplary compound(s). More preferably, it refers to a case where the coating film consists only of the exemplary compound(s) described above (which includes a case where other substances are inevitably introduced therein).

In certain embodiments, the transparent coating film includes two or more layers.

The coating film may be formed from a single layer, however, preferably formed from two or more layers. By making the coating film to include a plurality of layers so that different materials (inorganic compounds) are combined with one another, a more excellent property is attained. For example, light transmittance (transparency) can be improved over a wide wavelength range. Further, by providing a layer made of a material having good adhesion to the optical lens as the lowermost layer, mechanical strength (prevention of peeling due to rubbing and the like) can be improved.

Further, the light transmittance can be improved by adding an anti-reflection function to the coating film. By making the coating film have a two-layered structure including an upper layer made of $MgF_2$, $LaF_3$, $SiO_2$, or the like having an excellent anti-reflection function (small refractive index) and a lower layer made of $TiO_2$, $Al_2O_3$, $Y_2O_3$, $Ta_2O_5$, $La_2O_3$, $ZrO_2$, or the like ($LaF_3$ can also be used if the upper layer is not made of $LaF_3$) having excellent mechanical strength, the coating film can have both excellent light transmittance and excellent mechanical strength.

The coating film including a plurality of layers can be made by forming a lower layer with the method described above, e.g., PVD, and forming another layer on the lower layer by repeating the same method.

In certain embodiments, the transparent coating film includes a lower layer made of $SiO_2$ and having a thickness of 5 to 20 nm, an intermediate layer formed on the lower layer, made of $TiO_2$ and having a thickness of 5 to 20 nm, and an upper layer formed on the intermediate layer, made of $SiO_2$ and having a thickness of 5 to 20 nm.

By making the coating film have this three-layered structure with the thickness of each layer being in a range of 5 to 20 nm, more excellent solvent resistance, and mechanical strength are obtained. In addition, incident light is reflected to a small extent at an interface between the $SiO_2$ layer and the $TiO_2$ layer, so that excellent light transmittance is obtained.

Effects of the Invention

The optical lens according to the present invention is lightweight, highly transparent, and resistant to discoloration, deformation, aging, and the like due to irradiation with a xenon lamp or a blue-violet laser. The optical lens is thus suitable for use as a lens for a flash lamp, or a lens for a blue-violet laser (lens for Blu-ray).

BEST MODES FOR CARRYING OUT THE INVENTION

Best modes for carrying out the present invention will now be described with reference to examples. It is noted that the present invention is not limited to the examples described herein, but may be modified to another mode as long as it does not compromise the purpose of the present invention.

Examples 1 to 6 and Comparative Examples 1 to 2

In examples 1 and 3 to 6, and comparative example 2, as the transparent polyamide, a condensation polymer of 1,10-decanedicarboxylic acid and 3,3'-dimethyl-4,4'-diaminodicyclohexylmethane (Grilamid TR-90, trade name by EMS-CHEMIE (Japan) Ltd.) was used.

In example 2, as the transparent polyamide, a copolyamide composed of isophthalic acid and 3,3'-dimethyl-4,4'-diaminodicyclohexylmethane and laurinlactam (Grilamid TR-55, trade name by EMS-CHEMIE (Japan) Ltd.) was used.

In comparative example 1, polymethyl acrylate (Delpet 80NR, trade name by Asahi Kasei Chemicals Corporation) was used instead of the transparent polyamide.

The following components were blended at blend ratios shown in Table 1 (all expressed in parts by weight) into the transparent polyamides and the polymethyl acrylate, respectively, with a twin-screw mixer (Toshiba Machine Co., Ltd., TEM 58BS). Thereafter, injection molding was performed with SE-18 (electric injection molding machine manufactured by Sumitomo Heavy Industries, Ltd.), to mold optical lens samples each having a thickness of 2 mm. When the transparent polyamide was used, the injection molding was performed under conditions of a resin temperature of 290° C., a mold temperature of 80° C., and a cycle of 40 seconds.

[Stabilizer]
Irgafos 168 (tris(dibutylphenyl)phosphite) (trade name: phosphorous-based antioxidant manufactured by Ciba Specialty Chemicals Inc.)
Irganox 245 (triethyleneglycol-bis[3-(3-t-butyl-5-methyl-4-hydroxyphenyl)propionate]) (trade name: hindered phenolic antioxidant manufactured by Ciba Specialty Chemicals Inc.)
Methyl ethyl hydroquinone (expressed as MEHG in the Tables)

[Cross-Linking Assistant] TAIC (triallyl isocyanurate: manufactured by Nippon Kasei Chemical Co., Ltd.)

In examples 1 and 2 and comparative example 1, total light transmittance, values from light-resistance tests, and appearance after the light-resistance tests were measured with the following method for the molded optical lens samples. In comparative example 2, since cross-linking occurred during twin-screw mixing and a pellet was not obtained, total light transmittance was not measured and light-resistance tests were not conducted.

In example 3, example 4, example 5, example 6, and comparative example 2, the molded optical lens samples were irradiated with electron beams of 240 kGy for cross-linking Total light transmittance, values from light-resistance tests, appearance after the light-resistance tests, and a storage modulus of elasticity (270° C.) were measured with the following method for the irradiated samples. These results are shown in Table 1 and Table 2. It is noted that, in example 5, only total light transmittance was measured and values from light-resistance tests, appearance after the light-resistance tests, and a storage modulus of elasticity were not measured. In example 6, only total light transmittance and a storage modulus of elasticity were measured and values from light-resistance tests and appearance after the light-resistance tests were not measured.

[Total Light Transmittance]

Total light transmittance was measured in compliance with JIS K 7361. A ratio between an amount of incident light $T_1$ and a total amount of light $T_2$ that has passed through a test piece in a range of visible light (range of a wavelength from 400 to 800 nm) is expressed in percentage.

[Values From Light-Resistance Tests and Appearance After the Light-Resistance Tests]

The sample having a thickness of 2 mm and maintained at 23° C. or 80° C. was irradiated with light having irradiation energy in an amount of 1000 W/m$^2$ per unit time for 500 hours by placing light rays (xenon lamp) at a position 7 mm away from a surface of the sample. Thereafter, total light transmittance was measured in the same manner as described above. The measurement values are shown in Table 1 and Table 2 as values from light-resistance tests. Further, the irradiated lens surface was visually inspected, the results of which are shown in (Appearance after light-resistance test) in Table 1 and Table 2.

[Storage Modulus of Elasticity]

Storage moduli of elasticity at 270° C. of the samples after being heated for 10 minutes at 200° C. were measured with a dynamic mechanical spectrometer DVA-200 manufactured by IT Keisoku Seigyo Co., Ltd. at a rate of temperature increase of 10° C./min.

TABLE 1

| | | Example 1 | Example 2 | Example 3 | Example 4 |
|---|---|---|---|---|---|
| Transparent polyamide | Type | TR-90 | TR-55 | TR-90 | TR-90 |
| | Amount (parts by weight) | 100 | 100 | 100 | 100 |
| | Tg | 155° C. | 160° C. | 155° C. | 155° C. |
| Stabilizer (parts by weight) | Irgafos 168 | 0.1 | 0.1 | 0.1 | 0 |
| | Irganox 245 | 0.1 | 0.1 | 0.1 | 0 |
| | MEHQ | 0 | 0 | 0.01 | 0.01 |
| TAIC (parts by weight) | | 0 | 0 | 5 | 20 |
| Total light transmittance (before irradiation) | | 91 | 90 | 88 | 90 |
| Value from light-resistance test | 23° C. | 91 | 88 | 86 | — |
| | 80° C. | 89 | 81 | 83 | — |
| Appearance after light-resistance test | 23° C. | No discoloration | Discolored to light yellow | Light yellow** | Light yellow** |
| | 80° C. | No discoloration | Discolored to black | Light yellow** | Light yellow** |
| Storage modulus of elasticity (MPa) | | * | * | 3 | 12 |

* Smaller than detection limit, and could not be measured.
**Colored during electron beam irradiation, and not discolored during light-resistance test.

TABLE 2

| | | Comparative example 1 | Example 5 | Example 6 | Comparative example 2 |
|---|---|---|---|---|---|
| Transparent resin | Type | Delpet 80N | TR-90 | TR-90 | TR-90 |
| | Amount (parts by weight) | 100 | 100 | 100 | 100 |
| | Tg | 105 | 155 | 155 | 155 |
| Stabilizer (parts by weight) | Irgafos 168 | 0.1 | 0 | 0 | 0 |
| | Irganox 245 | 0.1 | 0 | 0 | 0 |
| | MEHQ | 0 | 0.01 | 0.01 | 0 |
| TAIC (parts by weight) | | — | 30 | 1 | 20 |
| Total light transmittance (before irradiation) | | 92 | 89 | 91 | Since cross-linking occurred during twin-screw mixing, a pellet was not obtained. |
| Value from light-resistance test | 23° C. | 92 | — | — | |
| | 80° C. | 72 | — | — | |
| Appearance after light-resistance test | 23° C. | No discoloration | — | — | |
| | 80° C. | White streaks occurred | — | — | |
| Storage modulus of elasticity (MPa) | | — | — | 2 | |

As shown in Table 1 and Table 2, the molded bodies in examples 1 to 6 each have total light transmittance of approximately 90%, thus obtaining excellent transparency comparable to that of inorganic glass. Further, the molded bodies in examples 1 to 3 also have excellent values from light-resistance tests, which shows that deterioration due to irradiation with light from a xenon lamp serving as a light source only occurs to a small extent. Using the samples thus obtained for a flash lamp of a digital camera, tests of light emission with a xenon light source were conducted, and a function as a flash lamp was demonstrated.

It is noted that, as to the lenses in examples 1, 3, and 4 where the condensation polymer of 1,10-decanedicarboxylic acid and 3,3'-dimethyl-4,4'-diaminodicyclohexylmethane (Grilamid TR-90) was used as the transparent polyamide, no change in appearance was found between before and after the light-resistance tests (in examples 3 and 4, the lens was colored to light yellow during electron beam irradiation, however, did not change between before and after the light-resistance tests). In example 2 where the copolyamide composed of isophthalic acid and 3,3'-dimethyl-4,4'-diaminodicyclohexylmethane and laurinlactam (Grilamid TR-55) was used, however, the lens was colored to light yellow in the light-resistance test at 23° C., and discolored to black in the light-resistance test at 80° C. In comparative example 1 where polymethyl methacrylate was used as a material for the lens, white streaks occurred after the light-resistance test at 80° C. It is therefore shown that, from the viewpoint of preventing coloring of the lens used for a flash lamp or the like with a xenon light source, the transparent polyamide which is a condensation polymer of 1,10-decanedicarboxylic acid and 3,3'-dimethyl-4,4'-diaminodicyclohexylmethane is superior to other transparent polyamides, polymethyl methacrylate, and the like.

Moreover, in examples 3, 4, and 6 where less than 25 parts by weight TAIC were added to 100 parts by weight transparent polyamide and irradiation with radioactive rays was conducted, a molded body having a high reflow heat resistance as well as a high storage modulus of elasticity was obtained, and particularly a modulus of elasticity of $10^7$ Pa or more was obtained in example 4. In examples 1 and 2 where TAIC was not added and irradiation with radioactive rays was not conducted, however, a sufficiently high reflow heat resistance was not obtained.

In example 5 where 30 parts by weight TAIC were added to 100 parts by weight transparent polyamide, solidification in the mold was delayed, resulting in occurrence of optical distortion which caused unevenness of permeability, occurrence of deformation when pressed with an ejector pin, and the like. Consequently, appearance of the molded product was poorer than in examples 6, 3, and 4 where an added amount of TAIC was 1 part by weight, 5 parts by weight, and 20 parts by weight, respectively. Based on this result, it is believed that an added amount of TAIC is preferably less than 25 parts by weight with respect to 100 parts by weight transparent polyamide. Further, since favorable appearance of the molded product was obtained in examples 6, 3, and 4, it is believed that an added amount of TAIC is more preferably in a range of 1 to 20 part(s) by weight with respect to 100 parts by weight transparent polyamide. Although an added amount of TAIC is 20 parts by weight with respect to 100 parts by weight transparent polyamide in comparative example 2, cross-linking occurred during twin-screw mixing and a pellet was not obtained because a stabilizer was not added.

Examples 7 to 8 and Comparative Examples 3 to 4

An optical lens sample having a thickness of 2 mm obtained with a method the same as that in example 1 (referred to as sample 1) was prepared. Further, an optical lens sample having a thickness of 2 mm obtained with a method the same as that in example 3 except that an amount of electron beam irradiation was set to 60 kGy and that a blended amount of TAIC was set to 10% by weight with respect to the transparent polyamide (referred to as sample 2) was prepared.

An $SiO_2$ layer having a thickness of 10 nm was formed on opposite surfaces of each of sample 1 and sample 2 with a sputtering method using Ar. Thereafter, a $TiO_2$ layer having a thickness of 10 nm was formed on this $SiO_2$ layer with a sputtering method using Ar, and an $SiO_2$ layer having a thickness of 10 nm was further formed on the $TiO_2$ layer with a sputtering method using Ar, to obtain an optical lens sample including a coating film having a three-layered structure. These are referred to as sample 3 and sample 4, respectively.

Each of samples 1 to 4 was immersed in 100% ethanol at 30° C. for one minute, and then a surface of the coating film was scrubbed with Kimwipe and visually inspected, the results of which are shown in Table 3.

TABLE 3

| Example No. | Sample | Cross-link | Coating film | Surface condition |
|---|---|---|---|---|
| Example 7 | Sample 3 | No | Yes | Did not turn white |
| Example 8 | Sample 4 | Yes | Yes | Did not turn white |
| Comparative example 3 | Sample 1 | No | No | Turned white |
| Comparative example 4 | Sample 2 | Yes | No | Turned white, although to smaller extent than in comparative example 3 |

* Yes refers to a case where TAIC was used and irradiation with radioactive rays was conducted, and No refers to a case otherwise.

It is shown in the results in Table 3 that, by providing the coating film made of an inorganic compound on the surface of the lens sample, deterioration (turning to white) of the surface was sufficiently prevented even after cleaning with 100% ethanol was conducted. This effect was obtained also for the lens sample in which resin was not cross-linked. In comparative examples 3 and 4 where the coating film was not provided, on the other hand, deterioration (turning to white) of the surface occurred due to cleaning with 100% ethanol, which shows that this deterioration (turning to white) of the surface cannot be prevented even by cross-linking resin (comparative example 4).

Based on results of measurement of total light transmittance for the sample in example 7 and comparison thereof with the measured value for the sample in example 1, it became clear that the total light transmittance of the coating film in this example was 98%.

INDUSTRIAL APPLICABILITY

The optical lens according to the present invention is suitable for use in applications as a lens for a flash lamp (e.g., a Fresnel lens for a flash lamp), a lens for a blue-violet laser (Blu-ray), or the like.

The invention claimed is:
1. An optical lens comprising a molded body made of a molding material containing a transparent polyamide cross-linked through irradiation with radioactive rays and a stabilizer,
    said optical lens having total light transmittance of at least 60% when said molded body has a thickness of 2 mm, and having total light transmittance of at least 50% after said molded body maintained at 80° C. is irradiated with light in an amount of 1000 W/m² for 500 hours by using a xenon lamp, said transparent polyamide is composed of a condensation polymer of 1,10-decanedicarboxylic acid and 3,3'-dimethyl-4,4'-diaminodicyclohexylmethane, a blend ratio of said stabilizer being 0.01 to 0.21 parts by weight with respect to 100 parts by weight said transparent polyamide, and said stabilizer including 2-methyl-6-ethyl-hydroquinone.

2. The optical lens according to claim 1, wherein said transparent polyamide is a polyamide having an aromatic ring or an aliphatic ring, or a polyamide having a carbon number of at least 10 obtained by ring-opening polymerization of lactam or condensation of ω-aminocarboxylic acid.

3. The optical lens according to claim 1, wherein said transparent polyamide is composed of a monomer constituted only of chemical bond having a main polarizability of $0.6 \times 10^{-23}$ or less.

4. The optical lens according to claim 1, wherein said molded body of transparent resin has a storage modulus of elasticity at 270° C. of at least 0.1 MPa.

5. The optical lens according to claim 1, wherein said molding material further contains a filler.

6. The optical lens according to claim 1, wherein said molding material further contains less than 25 parts by weight TAIC with respect to 100 parts by weight transparent polyamide.

7. The optical lens according to claim 1, comprising a coating film made of an inorganic compound and having total light transmittance of at least 80% on at least one surface thereof.

8. The optical lens according to claim 7, wherein said inorganic compound is selected from the group consisting of $MgF_2$, $YF_3$, $LaF_3$, $CeF_3$, $BaF_2$, $HfO_2$, $SiO_2$, $TiO_2$, $Al_2O_3$, $Y_2O_3$, $La_2O_3$, $Ta_2O_5$, and $ZrO_2$.

9. The optical lens according to claim 7, wherein said coating film is formed of two or more layers.

10. The optical lens according to claim 9, wherein said coating film is formed of a lower layer made of $SiO_2$ and having a thickness of 5 to 20 nm, an intermediate layer formed on said lower layer, made of $TiO_2$ and having a thickness of 5 to 20 nm, and an upper layer formed on said intermediate layer, made of $SiO_2$ and having a thickness of 5 to 20 nm.

* * * * *